Sept. 12, 1944. C. E. BLANCHARD ET AL 2,358,138

DUSTING APPARATUS

Filed Aug. 29, 1942

Inventors
CHARLES E. BLANCHARD &
ALBERT W. FERRE
by Robert T. Palmer
Attorney.

Patented Sept. 12, 1944

2,358,138

UNITED STATES PATENT OFFICE 2,358,138

DUSTING APPARATUS

Charles E. Blanchard, Randolph, and Albert W. Ferre, Wellesley, Mass., assignors to B. F. Sturtevant Company, Boston, Mass.

Application August 29, 1942, Serial No. 456,634

4 Claims. (Cl. 91—44)

This invention relates to dusting systems and apparatus for applying dust such, for example, as soapstone dust to uncured rubber articles such as rubber covered wires, cords, tubes, and the like.

It is common practice to dust uncured rubber articles with some form of powdered lubricant such as soapstone for preventing the articles from sticking when it is sticky and tacky following vulcanization of the articles.

An object of this invention is to improve the systems and apparatus for the dusting of rubber articles.

This invention provides more uniform films of dust of the desired density upon the rubber articles in continuous production and without loss of dust into the atmosphere of the apparatus room.

The invention will now be described with reference to the drawing of which:

Prior dusting systems and apparatus are generally of the type disclosed by the U. S. Patent No. 1,876,251, and this patent may be referred to for those details of well known dusting mechanism which are not disclosed in detail herein.

Figure 1:
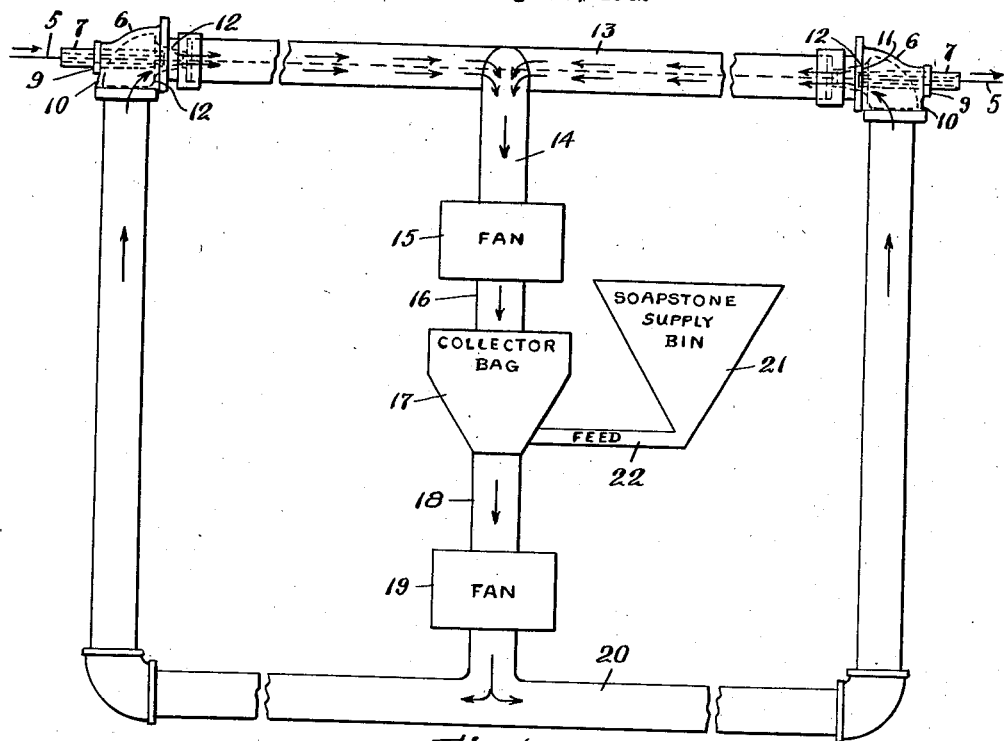
Fig. 1 is a diagrammatic view of one embodiment of the invention.

Referring now to Fig. 1 of the drawing, the rubber covered wire 5 is advanced by well known feed mechanism (not shown) through the left hand (facing the drawing) Venturi head 6, the dusting tube 13 and out the right hand Venturi head 5.

Figure 2:
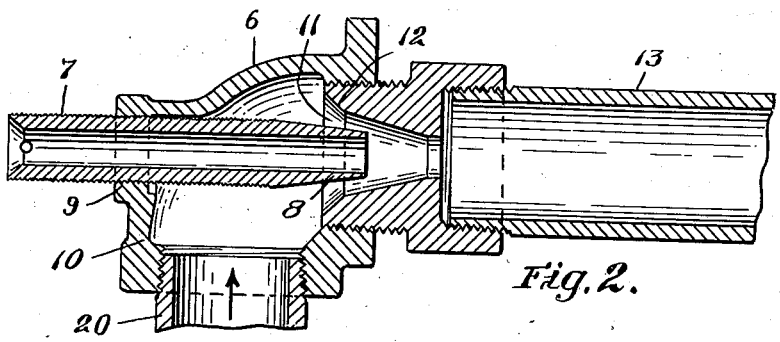
Fig. 2 is a view in vertical section, of one embodiment of a Venturi head which may be utilized in the system of Fig. 1.
Figure 3:
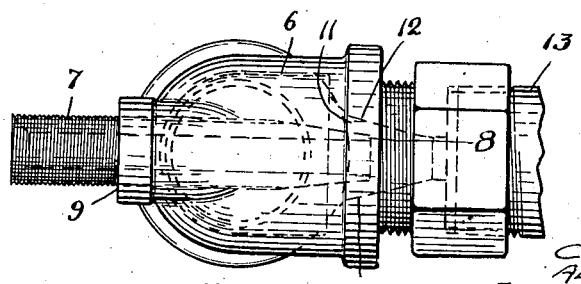
Fig. 3 is a plan view of the Venturi head of Fig. 2.

Each Venturi head 5 consists, as shown in more detail by Figs. 2 and 3, of the small tube 7 having the inner restricted nozzle 8. The tube 7 extends through the end wall 9 of the elbow 10 and has its nozzle 8 in the Venturi passage 11 formed between the converging walls 12.

The venturis 11 connect with the ends of the dusting tube 6 and discharge dust thereunto, around and on the wire 5 as will be described.

The discharge tube 14 connects into the tube 13 at its center and with the suction side of the fan 15. The fan 15 discharges through the duct 16 into the top of the collector bag 17.

The suction side of the fan 19 connects through the duct 18 with the bottom of the collector bag 17, and its discharge outlet connects through the duct 20 with the Venturi heads 6.

The dust supply bin 21 connects through its feed channel 22 with the base of the collector bag 17 and the dust is fed as usual for maintaining the proper dust density in the dusting tube 13.

The collector bag 17 is of cloth or some similar closely woven material which will pass air through its meshes under pressure, but will not exhaust dust.

In operation as the wire 5 passes through the tube 13, the fan 15 while exhausting air and excess dust from the tube 13, inflates the bag 17. Dust from the bin 21 is supplied through the feed channel 22 in the desired quantities. The fan 19 draws the dust laden air from the collector bag 17 and blows it through the duct 20 into the Venturi heads 6.

The dust laden air as it passes into the Venturi heads 6 has its velocity increased so that it issues in high velocity jets centrally around the wire 5. The air jets from the two heads 6 meet at the center of the tube 13 and are drawn into the discharge tube 14. It is seen that the wire 5 is surrounded by dust laden air blown centrally around same, the entire length of the tube 13, and that dust is deposited upon the tube during this travel. As the wire nears the right hand Venturi head 6, the velocity of the dust laden air having decreased near the center of the tube 13, increases again to a high velocity and blows the excess dust above that desired, from the wire.

Dust is prevented from escaping at the ends of the tube 13 by the ejector action of the dust laden air passing the ends of the nozzles 8. Atmospheric air from the apparatus room is drawn in through the tube 7 into the dusting tube 13 and thus air seals are formed. The positions of the tubes 7 in the Venturi heads 6 are adjustable for varying the induction effect. It is apparent that the same volume of air should be drawn in thrown the tubes 7 that is exhausted through the meshes of the bag 17. The tubes 7 may be easily adjusted so that the system is in air balance.

Several of the dusting tubes 13 may be used simultaneously in parallel operation for dusting a plurality of wires. In one actual installation four parallel dusting tubes were used.

Several wires may be passed simultaneously through each of the dusting tubes.

While one embodiment of the invention has been described for the purpose of illustration, it should be understood that the invention is not limited to the exact apparatus and arrangements of apparatus illustrated as modifications thereof may be suggested by those skilled in the art without departure from the essence of the invention.

What is claimed is:

1. Dusting apparatus having a dusting tube arranged to have a rubber article to be passed therethrough for dusting, comprising a dust supply source, a fan connected to said source for drawing dust therefrom, a pair of ducts connecting with said fan and connecting one with each of the longitudinal ends of said tube for supplying dust laden air thereinto, Venturi heads in said ends around the space where the article to be dusted passes therethrough and in which the dust laden air entering said ends has its velocity increased, means in said heads for inducing through the flow of the dust laden air, atmospheric air into said heads through said space, and means for recirculating dust laden air from said tube at a point between said ends, into said fan.

2. Dusting apparatus having a dusting tube arranged to have a rubber article to be passed therethrough for dusting, comprising a dust receiver, means including a fan connected to said receiver for drawing dust laden air therefrom, a pair of ducts connecting with said fan and connecting one with each of the longitudinal ends of said tube for supplying dust laden air thereinto, Venturi heads in said ends around the space where the article to be dusted passes therethrough and in which the dust laden air entering said ends has its velocity increased, means in said heads for inducing through the flow of the dust laden air, atmospheric air into said heads through said space, and means for recirculating dust laden air from said tube at a point between said ends, into said receiver, said receiver including means whereby clean air escapes therefrom.

3. Dusting apparatus having a dusting tube arranged to have a rubber article to be passed therethrough for dusting, comprising a dust receiver, means including a fan connected to said receiver for drawing dust laden air therefrom, a pair of ducts connecting with said fan and connecting one with each of the longitudinal ends of said tube for supplying dust laden air thereinto, Venturi heads in said ends around the space where the article to be dusted passes therethrough and in which the dust laden air entering said ends has its velocity increased, means in said heads for inducing through the flow of the dust laden air, atmospheric air into said heads through said space, and means including a fan for recirculating dust laden air from said tube at a point substantially midway between said ends, into said receiver, said receiver including means whereby clean air escapes therefrom.

4. Dusting apparatus having a dusting tube arranged to have a rubber article to be passed therethrough for dusting, comprising a dust supply source, a fan connected to said source for drawing dust therefrom, a pair of ducts connecting with said fan and connecting one with each of the longitudinal ends of said tube for supplying dust laden air thereinto, Venturi heads in said ends around the space where the article to be dusted passes therethrough and in which the dust laden air entering said ends has its velocity increased, means in said heads including ejector nozzles for inducing through the flow of the dust laden air, atmospheric air into said heads through said space, means for recirculating dust laden air from said tube at a point between said ends, into said fan, and means for adjusting said nozzles for varying their induction effect.

CHARLES E. BLANCHARD.
ALBERT W. FERRE.